Oct. 20, 1970  W. P. ACKERMANN  3,534,416

RECLINING DEVICE

Filed Jan. 11, 1968  6 Sheets-Sheet 1

INVENTOR
WILHELM PAUL ACKERMANN,

BY
ATTORNEYS

Oct. 20, 1970   W. P. ACKERMANN   3,534,416
RECLINING DEVICE
Filed Jan. 11, 1968   6 Sheets-Sheet 2

INVENTOR
WILHELM PAUL ACKERMANN,

BY
ATTORNEYS

Oct. 20, 1970     W. P. ACKERMANN     3,534,416
RECLINING DEVICE
Filed Jan. 11, 1968                6 Sheets-Sheet 3
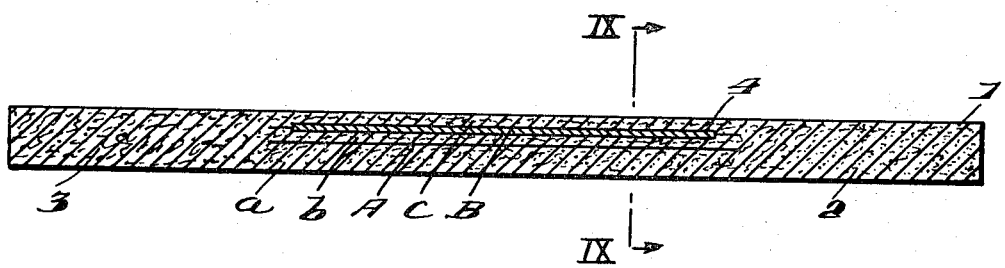
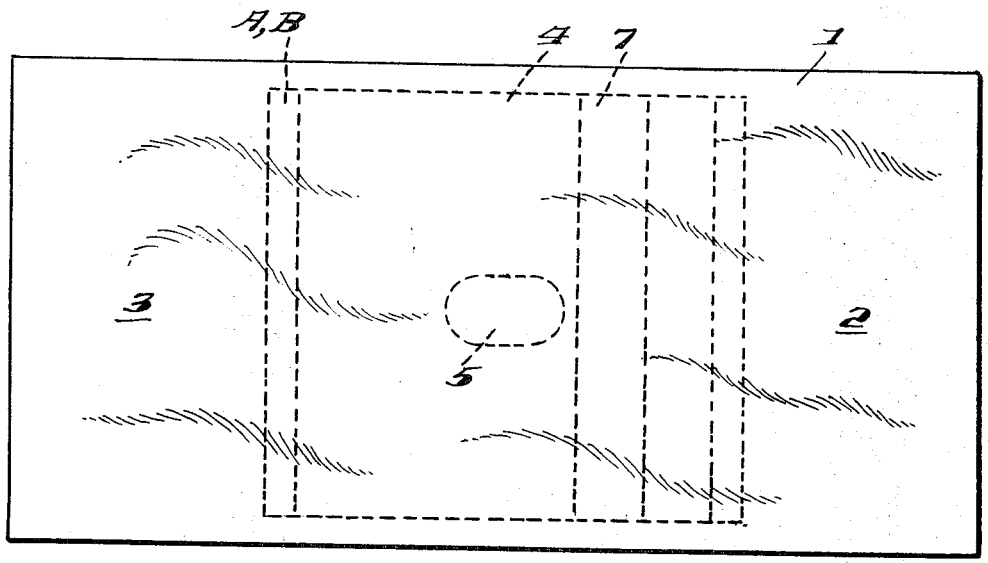
INVENTOR
WILHELM PAUL ACKERMANN,
BY
ATTORNEYS Oct. 20, 1970  W. P. ACKERMANN  3,534,416
RECLINING DEVICE
Filed Jan. 11, 1968  6 Sheets-Sheet 4
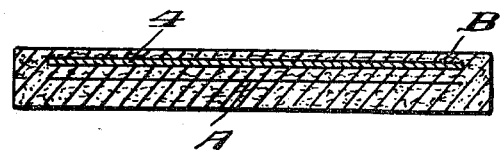
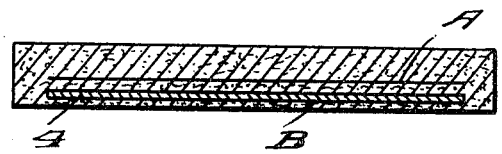
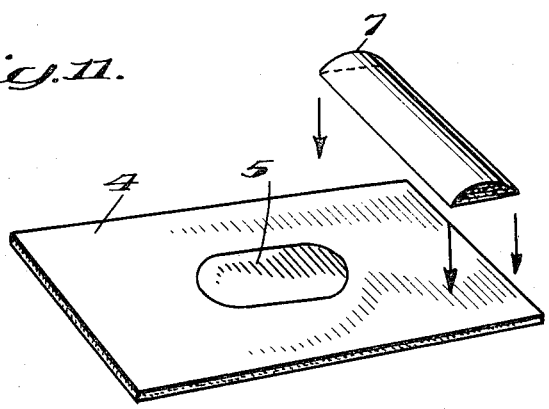
INVENTOR
WILHELM PAUL ACKERMANN,
ATTORNEYS

INVENTOR
WILHELM PAUL ACKERMANN,

ATTORNEY

Oct. 20, 1970      W. P. ACKERMANN      3,534,416
RECLINING DEVICE

Filed Jan. 11, 1968     6 Sheets-Sheet 6

INVENTOR
WILHELM PAUL ACKERMANN,

BY
ATTORNEYS

United States Patent Office 3,534,416
Patented Oct. 20, 1970

3,534,416
RECLINING DEVICE
Wilhelm Paul Ackermann, Brahegatan 24,
Stockholm, Sweden
Filed Jan. 11, 1968, Ser. No. 697,052
Claims priority, application Sweden, Feb. 9, 1967,
1,826/67
U.S. Cl. 5—345                                    7 Claims

ABSTRACT OF THE DISCLOSURE

A reclining device comprising a mattress or the like, said mattress having two parallel pockets, there being supporting members such as a disc and a pillow insertable in said pockets in order to adjust the hardness of the supporting surface of said mattress, so that a resting person may get uniform support to different parts of the body.

---

The present invention relates to a device for reclining which in respect of the hardness is adjusted or easily adjustable to the different desires and requirements of different persons.

Reclining devices hitherto known are in general provided with a supporting surface of constant hardness, which means that a certain reclining device is suited only to one person or a group of persons of a certain size and weight. But also one and the same person require sometimes different hardness of the mattress in dependence of whether he is lying sideways or lying on the back during the reclining. Also other factors have influence on the requirements of hardness of the supporting surface, if the resting should be perfect. Such factors may be illnesses of different kinds, especially dislocations and displacements of the skeleton of the user.

The present invention has for an object to provide a reclining device in which adjustment of the hardness may take place within very wide limits, so that the reclining device is adjusted or may be adjusted according to widely separated requirements and desires.

Figure 1:
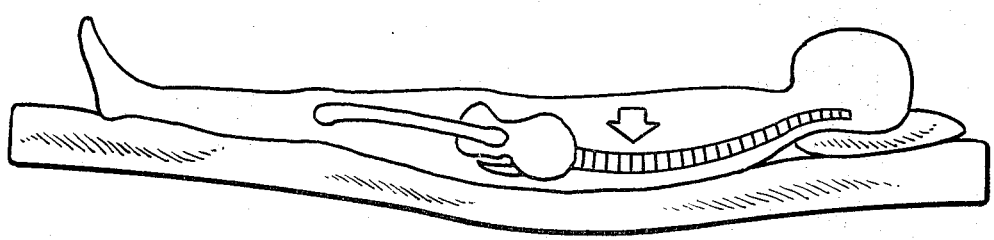
Figure 2:
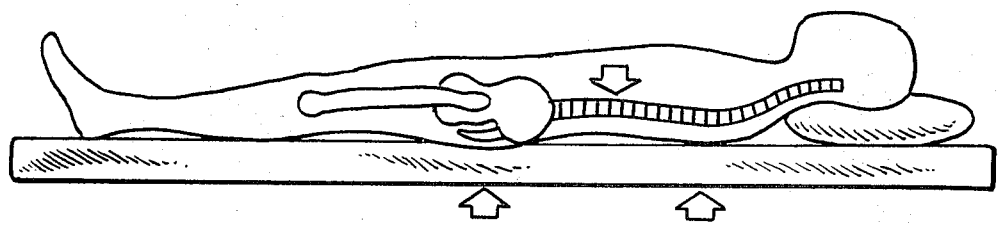
Figure 3:
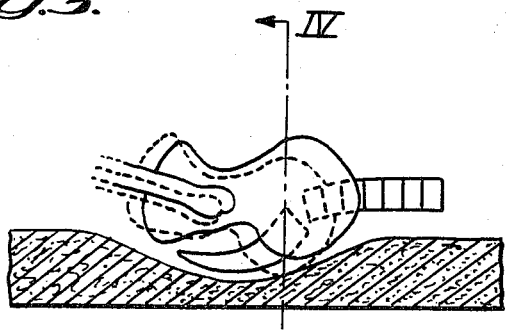
Figure 4:
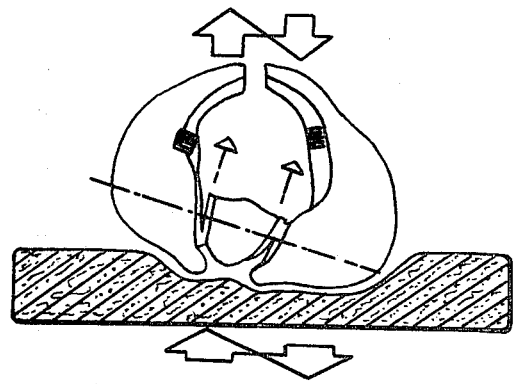
Figure 5:
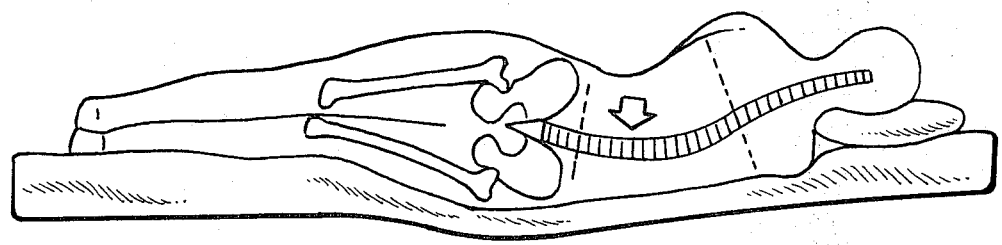
Figure 6:
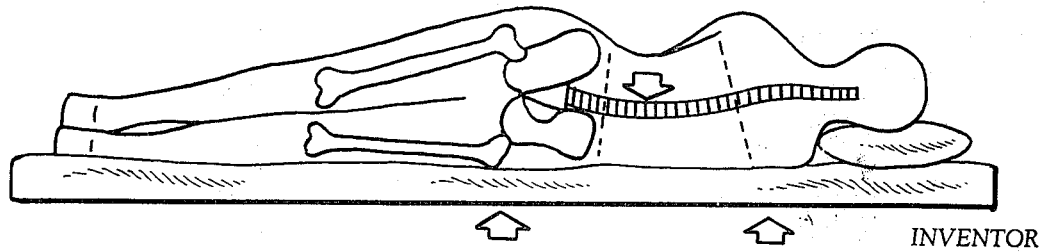
Figure 12:
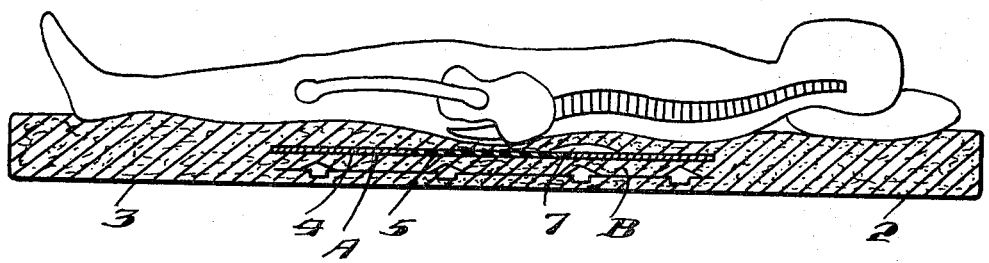
Figure 13:
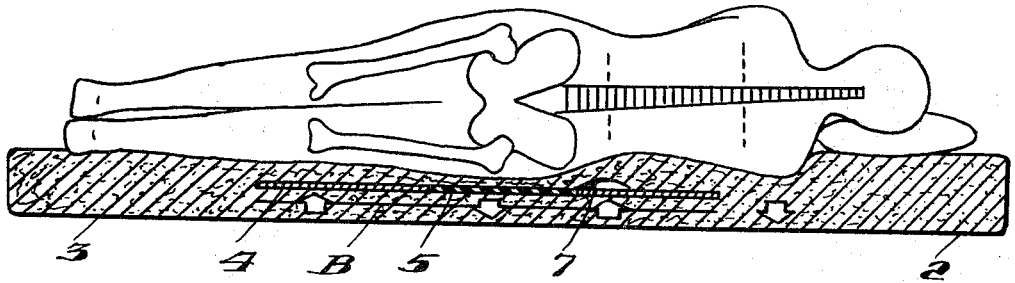
Figure 14:
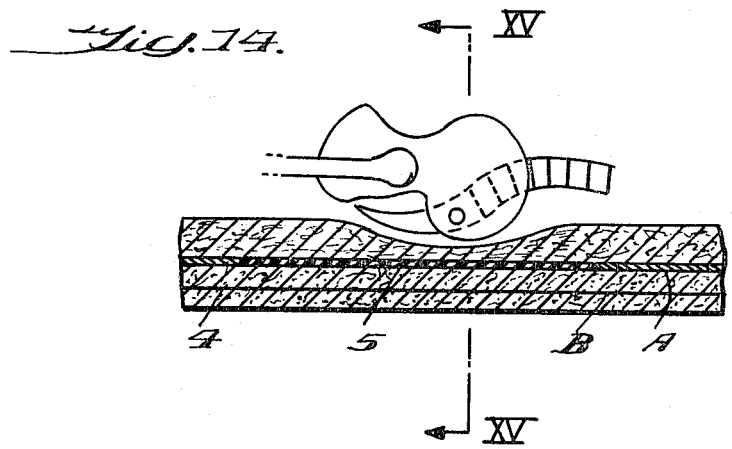
Figure 15:
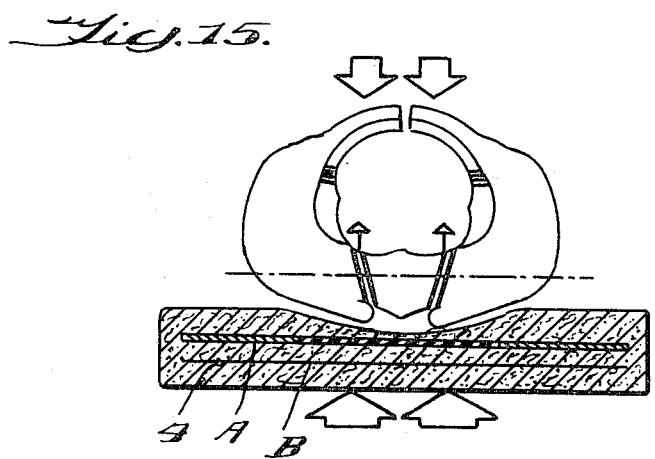

In the following the invention will be described more in detail, reference being had to the accompanying drawings, in which FIG. 1 illustrates a person resting on his back on a too soft supporting surface, FIG. 2 illustrates a person resting on his back on a too hard supporting surface, FIG. 3 illustrates on a greater scale the pelvis portion of a person which rests with his back down on a too soft supporting surface, FIG. 4 is a section of the arrangement according to FIG. 3 along the line IV—IV, as viewed in the direction of the arrow, FIG. 5 illustrates a person resting on his side on a too soft supporting surface, FIG. 6 illustrates a person resting on his side on a too hard supporting surface, FIG. 7 shows a mattress provided with a supporting surface according to this invention, as viewed from one side, FIG. 8 illustrates the same mattress, as viewed from the top, FIG. 9 illustrates a section of the mattress according to FIG. 7 along the line IX—IX, as viewed in the direction of the arrows, and in a certain condition of use, FIG. 10 illustrates a section, similar to that of FIG. 9, but in another condition of use, FIG. 11 is an exploded view of two details of the mattress according to FIG. 8, FIG. 12 illustrates a person resting on his back on a mattress according to this invention, FIG. 13 illustrates a person resting on the side on a mattress according to this invention, FIG. 14 illustrates on a greater scale the pelvis portion of a person resting on his back on a supporting surface of proper hardness, and FIG. 15 is a section of the arrangement according to FIG. 14 along the line XV—XV, as viewed in the direction of the arrows.

In FIGS. 1-6 there are illustrated reclining devices with an incorrect hardness. There will be no convenient and relaxed resting on such reclining devices. The sleep is disturbed and there will be no pleasant feeling of recreation on awakening. Further, as will be apparent from the figures, such reclining devices may bring about displacements and dislocations in the skeleton of the resting person and may give rise to muscle tensions which may result in aches and illnesses of different kinds.

From FIG. 1 it will be apparent that on a too soft mattress (or a thin mattress on a too soft bed surface) the heaviest part of the body, the pelvis portion, does not get sufficient support and will sink down too much. Therefore, the pelvis can not maintain its natural position with respect to the spinal column. This is tiresome in the long run and may give rise to aches in the lumbar portion upon awakening.

In FIG. 2 there is illustrated, that when a person is lying on his back on a too hard supporting surface, this brings about, among others, that the spinal column is exposed to a longitudinal stress which gives to result that the muscles cannot relax. Nerve pressure, pains and achings may arise after some time and there will be no feeling of being reposed when one awakes.

In FIGS. 3 and 4 there is illustrated how a too soft supporting surface adjusts itself to a dislocation of the pelvis which already exists and how such dislocation becomes worse. This dislocation of the pelvis gives rise to torsional stresses in the lumbar region which can be felt all the way to the head. This, in turn, will give rise to muscle tensions and nerve aches. Also the discs will be exposed to torsional stresses and unsymmetrical loads (this usually occurs, for example, during pregnancy when the weight of the body is increased).

In FIG. 5 there is illustrated what happens when a person rests sideways on a too soft supporting surface. The weight of the body is unfavourably distributed. The back portion is very much deformed, because the pelvis portion has sunken down and the trunk between the hips and the shoulders is not supported. Disturbances of the circulation and aches will result from this condition.

In FIG. 6 there is illustrated the position of the body when a person rests sideways on a too hard supporting surface. The weight of the body is in this case concentrated to the shoulder and the hip portions. Because these portions cannot sink down sufficiently, the spinal column will be unnaturally curved. The shoulder portions and the arms will frequently go numb, if one rests for a long time in this position. Among others, this will result in aches in the back part of the head. Also the head of the thigh bone will be loaded too much, which will result in an inclination of the pelvis.

In FIG. 7 there is illustrated an embodiment of a mattress according to the invention, as viewed from the side, and which gives a supporting surface which is adjusted or may be adjusted according to desire of the resting person, so that the latter will get a nice and pleasant rest with relaxing of the joints and of the muscles, while a natural skeleton position is maintained. The mattress is provided with a mattress tick or other cover 1 and comprises padding for example horse hair, vulcanized horse hair, cotton, foam rubber or polyester, foam plastic or the like. The upholstery is divided in three layers viz, one layer a, in the drawing illustrated to be lowermost, one layer b which is an intermediate layer, and a layer c which in the drawing is the uppermost layer. Between the different layers there are pockets, viz, between the layer a and the layer b a pocket which is designated A, and between the layer b and the layer c a pocket designated B. The pockets could be opened at the side of the mattress and the openings are closable by means of zip fasteners.

The pockets extend over the greatest part of the width of the mattress but not over its whole length. At each end of the mattress there is an end portion 2 and 3, respectively, into which the pockets do not extend.

Alternatively, one or both pockets may be arranged so that they can be opened or accessible from one or both of the plane sides of the mattress. In that case, the openings may be covered by lids of padded material which may be fastened at the rims by means of zip fasteners or in any other suitable way.

The reference character 4 designates a separate plate which is intended to be inserted in one of the pockets A or B or to be put under the mattress.

In FIG. 8. there is illustrated a mattress according to FIG. 7, as viewed from the top. In one of the pockets the plate or the disc 4 is inserted. This plate or disc is of a hard or a somewhat springy material and may be made from, for example, cardboard, plywood, hard synthetic resin or the like.

The plate 4 may be provided with padding on one of its sides or on both sides and in the latter case the padding on the two sides may have different thickness or be of different hardness. The padding may comprise a layer of foamed plastic, foamed rubber or the like which has, for example, a thickness of 1 cm.

As will be evident from FIG. 8, the plate 4 is suitably somewhat shorter than the pocket A or B in which it is inserted. By this means it will be possible to move the plate to a suitable position in the longitudinal direction of the mattress, so that the upper rim of the plate will be best suited to the convenience of the resting person.

If the plate 4 is inserted in the pocket B in the mattress according to FIG. 7, one obtains a rather hard mattress, because it is only the rather thin layer c of the padding which is above the plate 4. A mattress with such hardness may be suitable for a rather light person and it may provide a convenient support to the person when he rests on his back as well as when he rests on his side. The length of the plate 4 should be so adjusted, that the shoulder portion of the resting person will be within the region of one of the end portions 2 or 3 according to FIG. 1, so that the shoulder of the person may sink down in the soft padding outside the plate 4.

In FIG. 9 there is illustrated a section through the mattress along the line IX—IX in FIG. 7 and the plate 4 is inserted in the upper pocket B. In that case, the supporting surface is rather hard. If one wants a softer supporting surface, the plate 4 may be moved to the pocket A. In that case, the section along the line IX—IX in FIG. 7 will be as is illustrated in FIG. 10.

In FIG. 11 there is shown a perspective view of the plate 4 and an additional pillow or supporting cushion 7 which is intended to be inserted in one of the pockets A or B in the mattress beneath the waist portion of the resting person, suitably on top of the plate 4. In some cases the pillow or supporting cushion may be fastened to the plate 4 which is illustrated in FIG. 11.

According to a modified embodiment of the present invention, which has proved to be very useful in some special cases, the plate 4 has a central portion 5 which may be elliptic or rectangular and which is made of a material that is considerably more flexible than the material in the rest of the plate or which may be constituted by an opening in the plate. In the latter case the rims of the opening should be rounded and the opening may be covered on each side of the plate with an elastic membran, for example a rubber membran, a wire net or the like. If the plate 4 is made from a synthetic resin, the plate may be hardened to great hardness in all places except at the portion 5, where the material may be soft or flexible.

If the plate 4 has a padding, said padding should also cover the central flexible portion 5.

When a person is resting sideways on a mattress with a plate 4 having a central portion 5 as now described, the hip portion should be above said central portion 5 as illustrated. The hip portion may sink down so that the pelvis will not be pushed upwards by the hard supporting surface in the way which is illustrated in FIG. 6.

When a sleeping person lies on his back, the soft part 5 of the plate 4 will not be noticed, because in that case it is a greater surface of the resting person which is pressing against the supporting surface.

The embodiment just described in very suitable for persons who have troubles or pains in the region about the upper part of the thigh bone.

In FIG. 12 there is illustrated a person resting on his back on a supporting surface according to the present invention. The adjustable supporting plate gives the correct support to the skeleton and the body may occupy an anatomical correct and relaxing position. The spinal column will be tensioned to a correct degree, the muscle tensions will vanish, the circulation increases. The body is reposing in a natural way.

In FIG. 13 there is illustrated the position of the body of a resting person, when the person is reclining sideways on a supporting surface according to the present invention. The shoulder portion is outside the plate 4, while the rest of the body is supported by the plate 4. If said plate 4 has a resilient central portion 5, the portion around the upper end of the thigh bone (trocanta major) has an elastic but firm support on said central, resilient portion 5 of the plate 4. Further, the auxiliary pillow or supporting cushion 7 may, as illustrated, be applied on the plate 4 beneath the waist party of the resting person. By this means, the pressure will not be concentrated solely to the shoulder portion and the portion around the upper part of the thigh bone but will be substantially equally distributed under the whole body. This facilitates the natural reflex movements during the sleep by which dislocated vertebras will be moved to their correct positions again. In that way, any displacement in the back which has already occurred may be corrected during the sleep. The spinal column occupies a horizontal position and the resting will be pleasant.

The pillow 7 may, as has already been mentioned, either be loosely applied on top of the plate 4 or be fastened to the latter.

According to a further embodiment of the invention it may be possible to provide a further pillow, not shown, similar to the pillow 7, applied beneath the lower part of the thigh bone portion of the resting person, but, as a rule, this arrangement is not necessary.

The pillow 7 may comprise a padding of suitable hardness or be made of a hard material.

If one wants a softer support, one may, as has already been mentioned, move the plate 4 from the pocket B to the pocket A. By turning the mattress, one may obtain several possibilities of variation with regard to the hardness of the padding. If, for example, the layer a has a thickness of 5 cm., the layer b 2 cm. and the layer c 2 cm., the following possibilities of variation are obtained: If the plate 4 is located in the pocket B and the mattress is in the position illustrated in FIG. 7, an effective padding will be obtained which is only 2 cm. thick. If the plate 4 instead is located in a pocket A, one obtains a padding which is 4 cm. thick. If the plate 4 is located under the mattress, a padding of 9 cm. thickness will be obtained. If the mattress is turned so that the side which in FIG. 7 is shown to be the bottom side, will be the top side, and the plate 4 is located in the pocket A, a padding of 5 cm. thickness is obtained. If the plate 4 is located in the pocket B, a padding which is 7 cm. thick is obtained. Thus, one may, by this arrangement, obtain the following thicknesses of the paddings: 2, 4, 5, 7 or 9 cm. By turning the plate 4 (if this has a padding on one side), further possibilities of variation may be obtained.

In FIGS. 14 and 15 there is illustrated on a greater scale, how the pelvis postion of a person which rests on a mattress according to the invention will get a correct support and be kept in a correct position. Any dislocations or displacements of the pelvis and spinal column will tend to correct themselves during the sleep and one will wake reposed and without any ache.

It should be noticed, that the adjustment of the hardness of the supporting surface is rather critical, in order to obtain the correct support. Such as individual adjustment will not be possible to make in a mattress of a conventional type.

Different variations of the invention may be had within the scope of the appended claims.

What I claim is:

1. A reclining device, said device comprising a mattress having a reclining surface extending substantially throughout the length and width of the mattress, said mattress having at least one pocket between two layers of padding, said device also comprising a support member of harder material than the padding insertable in said pocket, said member being of substantially the same width as the reclining surfaces of the mattress and extending throughout the midsection of the mattress to the end porions thereof but leaving the end portions free of support by said member.

2. A reclining device comprising a mattress having at least one pocket between two layers of padding, a supporting member insertable in said pocket adapt the shape of hardness of said support surface according to desire, the supporting member insertable in said pocket comprising a disc of harder material than said padding, said disc having a softer central portion.

3. A reclining device according to claim 1, said mattress having two parallel pockets, and a padding between said pockets and padding outside said pockets, the thicknesses of the paddings between each of said pockets and the adjacent outside of said mattress being different.

4. A reclining device according to claim 1, said mattress having a first and a second pocket and three layers of padding located between one outside of said mattress and said first pocket, between said first pocket and said second pocket, and between said second pocket and the other outside of said mattress, respectively, the ratio of the thicknesses of said paddings being approximately 2:2:5.

5. A reclining device according to claim 1, wherein said insertable, supporting members are provided with a thin layer of padding.

6. A reclining device according to claim 5, wherein the supporting member insertable in said pocket comprises a disc of harder material, said disc having a cut-out central portion, said central portion having rounded edges, there being sheets of resilient material, such as sheets of elastic rubber, stretched over said cut-out, central portions.

7. A reclining device according to claim 5, therein said supporting member also comprises a supporting, elongated, at one side rounded pillow extending over substantially the whole width of said supporting surface but only over a small part of its length, said pillow being displaceable in the longitudinal direction of said supporting surface.

References Cited

UNITED STATES PATENTS

| 1,742,186 | 1/1930 | Claus | 5—341 |
| 2,543,218 | 2/1951 | Young et al. | 5—345 |
| 3,110,042 | 11/1963 | Slemmons | 5—345 |
| 3,276,046 | 10/1966 | Capelli | 5—338 |

BOBBY R. GAY, Primary Examiner

A. M. CALVERT, Assistant Examiner